United States Patent [19]

Abu-Isa et al.

[11] Patent Number: 4,842,257
[45] Date of Patent: Jun. 27, 1989

[54] VEHICLE SEAT SUSPENSION COMPONENT AND ITS METHOD OF MANUFACTURE

[75] Inventors: Ismat A. Abu-Isa, Rochester; Elio Eusebi, Troy; Craig B. Jaynes, Bloomfield Hills; Susan C. Moran, Ann Arbor; Michael A. Roy, Troy, all of Mich.

[73] Assignee: General Motors Corporation, Detroit, Mich.

[21] Appl. No.: 119,965

[22] Filed: Nov. 13, 1987

[51] Int. Cl.⁴ .......................... A47C 7/14; F16F 1/36; B28B 3/20
[52] U.S. Cl. .................. 267/133; 267/140.5; 267/141; 267/142; 297/452; 264/176.1
[58] Field of Search ............... 267/131, 133, 158, 160, 267/142, 140.5, 141, 73; 297/452, 441

[56] References Cited

U.S. PATENT DOCUMENTS

| | | | |
|---|---|---|---|
| 3,208,085 | 9/1965 | Grimshaw | 297/452 X |
| 4,265,484 | 5/1981 | Stalter | 267/142 X |
| 4,469,738 | 9/1984 | Himelreich, Jr. | 297/452 X |
| 4,545,614 | 10/1985 | Abu-Isa et al. | |
| 4,627,664 | 12/1986 | Okazaki et al. | 297/452 |
| 4,629,525 | 12/1986 | Rasmussen | 264/176.1 X |
| 4,753,481 | 6/1988 | Abe | 297/452 |
| 4,764,425 | 8/1988 | Balloni et al. | 264/176.1 X |

FOREIGN PATENT DOCUMENTS

| | | | |
|---|---|---|---|
| 0653100 | 11/1962 | Canada | 297/452 |
| 1495585 | 12/1977 | United Kingdom | 297/452 |

*Primary Examiner*—Andres Kashnikow
*Assistant Examiner*—Richard Potosnak
*Attorney, Agent, or Firm*—R. W. Tung

[57] ABSTRACT

A vehicle seat suspension has a thin high strength elastomeric membrane. The membrane is formed from block copolymer material by a process in which a sheet is extruded and tensioned to orient molecules in a select direction with respect to the membrane; the oriented membrane is annealed to retain the orientation during cyclical deformation of the membrane. The sheet form membrane is adapted to be connected with respect to a vehicle seat assembly frame and to serve as a backing for foam seating material and wherein the oriented structure of the membrane provides a two stage modulus in the direction of the orientation for providing static and dynamic load support characteristics which impart passenger comfort without increasing the weight of a seat assembly.

13 Claims, 3 Drawing Sheets

VEHICLE SEAT SUSPENSION COMPONENT AND ITS METHOD OF MANUFACTURE

TECHNICAL FIELD

This invention relates to vehicle seat suspensions and their method of manufacture and more particularly to vehicle seat assemblies which utilize an elastomeric component to support a vehicle passenger.

BACKGROUND OF THE INVENTION

Molded foam cushioning elements of the type set forth in U.S. Pat. No. 3,161,436, filed Dec. 15, 1964, have been used in automobile and vehicular applications to provide a vehicle seating assembly with both static and dynamic load supporting characteristics for passenger comfort. In such applications the element is supported by a rigid backing member forming part of the seat assembly frame for attachment to the vehicle body. In such cases the modulus of elasticity of the foam cushioning element and the thickness of the element is selected to provide a static deformation which conforms to and comfortably supports the weight/shape of different passengers. The cushioning elements have a modulus and are dimensioned to absorb dynamic impacts which are transferred through the vehicle suspension system into the seat assembly. In such cases the modulus and dimensions of the seating element are selected to absorb the impact loading without causing the foam element to fully compress and bottom out against the rigid backing member.

Such objectives can only be combined by use of foam elements with a thickness that will produce impact load absorption in a material of a modulus that has a comfortable feel under static load conditions. Such thickness of the foam element increases the weight of the vehicle seat assembly.

U.S. Pat. Nos. 2,251,318 and 4,545,614 disclose vehicle seat assemblies in which elastomeric webbing or strips are stretched between vehicle seat frame components to form a suspension for a seat cover. In the case of the U.S. Pat. No. 2,251,318 the strips are covered by a layer of foam material like spongy material which will impart static comfort to the assembly. The strap components are configured to yield to accommodate impact loads. The straps are reinforced by fabric to control against excessive deflection of natural rubber material of the straps.

The U.S. Pat. No. 4,545,614 uses strips or fibers of a material having a modulus at high deformation which is a multiple of natural rubber to control bottoming out of the suspension system. The use of strips, filaments or straps requires a cover to impart a smooth seating surface. Such covers can set to the shape of the underlying strip array following periods of use.

STATEMENT OF THE INVENTION AND ADVANTAGES

A feature of the present invention is to provide an improved seat suspension for a vehicle seat assembly which has a membrane element of block copolymer material oriented to provide a two stage modulus in the direction of the suspension span for providing a high comfort index under static load support conditions and an increasing load support characteristic for absorbing road impacts.

A further feature of the present invention is to provide an improved method for forming an elastomeric membrane for use as vehicle suspension components wherein a material of block copolymer composition is cast and extruded into sheet form with the material being tensioned during extrusion to orient the molecular structure of the material; the extruded material is then annealed to fix the material orientation for establishing a two stage modulus characteristic in the membrane.

Yet another object of the present invention is to provide a seat suspension means located between a seat cushion and a seat frame for absorbing vehicular vibrations and providing increased support in response to increased load; the seat suspension means including a membrane dimensioned to extend across substantially the full planar extent of the seat frame and including a molecular orientation of polymeric material which has a modulus greater across the width of said membrane than across the depth thereof.

Still another object of the present invention is to provide a seat suspension means located between a seat cushion and a seat frame for absorbing vehicular vibrations and providing increased support in response to increased load; the seat suspension means including a membrane dimensioned to extend across substantially the full planar extent of the seat frame and including a molecular orientation of polymeric material which is greater across the width of the membrane than across the depth thereof; the direction of orientation being aligned with the direction in which the membrane is tensioned and the orientation producing a stress to strain relationship which results in increasing load support in response to increased elongation in the direction of orientation of the membrane caused by such increased loads.

Another object of the present invention is to provide a new and improved low weight, easily assembled vehicle seat having a suspension component of membrane form which underlies a covering without interrupting smooth surface features of the covering and which is the sole component to support both static and dynamic loads.

Yet another object of the present invention is to provide a seat suspension component of the type set forth in any of the preceding objects wherein the component is a sheet form membrane made from a block copolymer consisting of polytetramethylene terephthalate polyester and polytetramethylene ether.

The present invention further resides in various novel constructions and arrangement of process steps and/or parts and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals are employed to designate corresponding parts throughout the several views, and in which:

DETAILED DESCRIPTION OF THE DRAWINGS

DETAILED DESCRIPTION OF THE INVENTION

Figure 1:
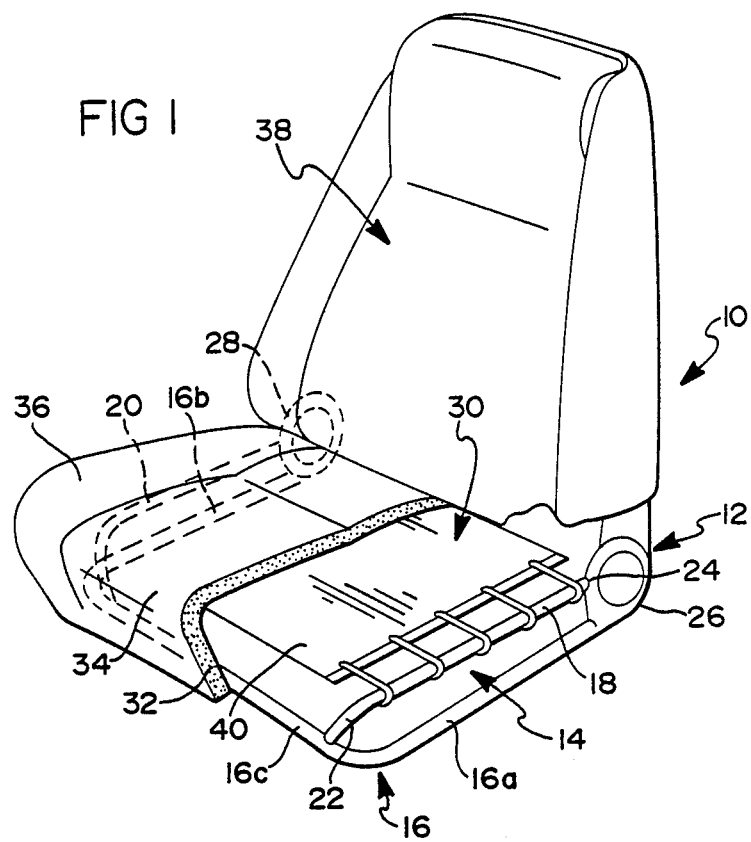
FIG. 1 is a perspective view of a vehicle seat seat assembly including the present invention.

Referring now to FIG. 1, a vehicle seat assembly 10 is illustrated including a back frame 12 and a seat frame 14.

The seat frame 14 includes a base tube 16 with side segments 16a, 16b joined by a front segment 16c. Suspension tubes 18, 20 are provided on either side of the seat frame 14. Each of the tubes 18,20 include an inwardly and downwardly bent end 22 that is welded to the base tube 16 slightly inboard of the side segments 16a, 16b. An aft end 24 on each of the tubes 18, 20 is welded to brackets 26, 28, respectively. The brackets 26, 28 are located on each side of the rear of the seat frame 14. The brackets 26, 28 can be rigidly connected to the back frame 12 or can serve as a pivot point for a back frame configuration capable of being tilted with respect to the seat frame 14.

The suspension tubes 18, 20 are thereby configured to support a seat suspension 30 constructed in accordance with the present invention. The suspension 30 is representatively shown as a seat in the vehicle seat assembly but is equally suitable for use in the back portion of such seat assemblies.

The seat suspension 30 is covered with a tin layer 32 of flexible foam material or other padding which will provide a comfortable feel when a passenger is seated thereon under static load conditions. It is preferred that the conformable layer 32 have a modulus that is less than the modulus of the seat suspension. The modulus of the conformable layer 32, i.e. less than 1 MPa, is also selected to enable it to conform to the shape of the passenger and transfer such shape to the seat suspension 30 where the static load is further conformed and supported in a manner to be discussed.

In the illustrated arrangement the conformable layer 30 also includes a cloth trim covering 34. The conformation layer 30 is representatively shown as including side bolsters 36 (only one illustrated). The back frame 14 supports a cloth covered sculptured foam back 38 which can be of conventional design or modified to include a suspension system such as seat suspension 30.

The use of the seat suspension 30 of the present invention enables less polyurethane foam or other padding material to be used in the vehicle seat assembly 10 and also improves both static and dynamic load support comfort of the seat assembly by absorbing high frequency low amplitude vehicular vibrations and also by absorbing large amplitude vehicle excursions resulting from severe road impacts such as the vehicle wheels hitting pot holes or the like.

In order to produce such desired results, the seat suspension 30 includes a sheet form membrane 40 made from a block copolymer of polytetramethylene terephthalate polyester and polytetramethylene ether. The material includes a combination of hard crystalline segments of the polyester and soft amorphous segments of the poly ether. Another example of a hard crystalline segment is polyethylene terephthalate polyester. Other amorphous segments can be either polyethyl ether or polypropyl ether. Annealing the material at a specific temperature while they are under tension orients the polyester molecules in one direction while leaving the poly ether molecules unaffected. As will be more specifically described, such orientation can produce a two stage stress to strain curve in which the curve has a relatively flat slope for a first range of seat suspension deflections and a relatively higher slope for a second range of seat suspension deflections.

Figure 5:
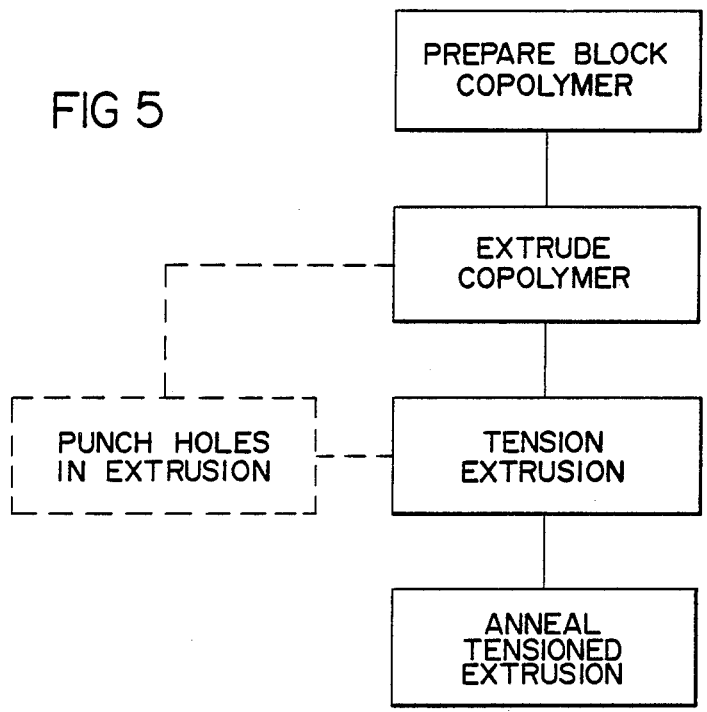
FIG. 5 is a chart of a process used in the manufacture of the membrane of the present invention.

One aspect of the present invention is to provide a process for making a sheet form membrane 40 with molecules oriented therein to produce desired stress strain characteristics. As shown in FIG. 5, the process includes the steps of preparing a mass of block copolymer material of the type specified above and maintaining it in a homogeneous state at a temperature of 260° C. by suitable mixing and heater means.

The blended material is directed into an extruder with a suitable die to produce a sheet. The sheet is drawn from the extruder by calendering rollers adjusted to speeds which maintain the sheet under tension in the direction of extrusion to produce a first axial orientation of the sheet. If desired, the sheet can be engaged by a tenter to increase the width of the sheet and maintain transverse tension thereon to produce biaxial orientation of the sheet.

The extrusion is then heated to anneal the material under tension. The biaxial orientation of the polyester molecules produces a membrane having the stress strain curve shown in FIG. 4.

Figure 4:
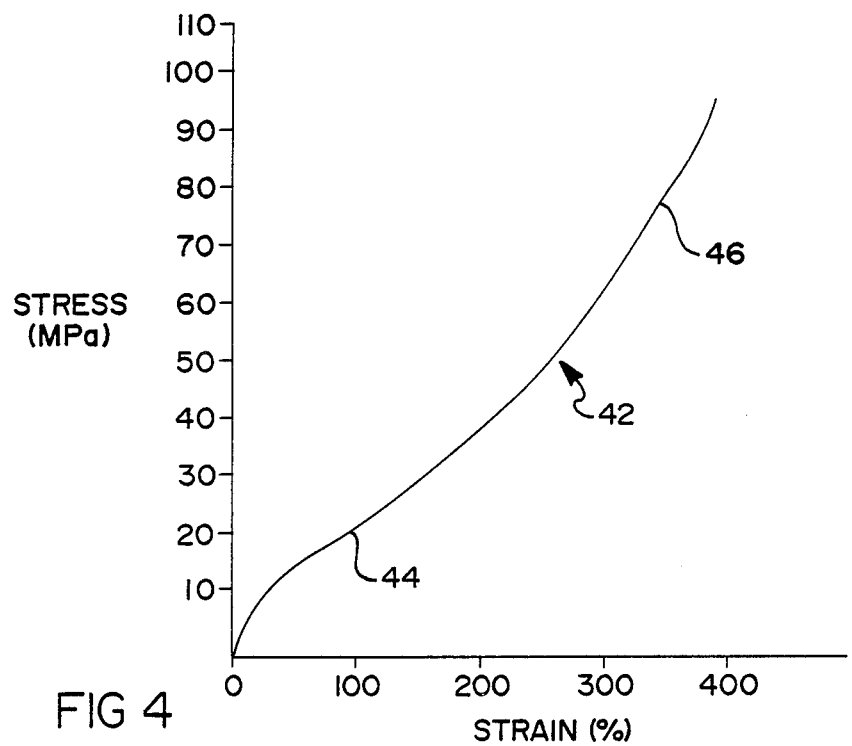
FIG. 4 is a stress strain curve of a block copolymer membrane used in the present invention.

The resultant membrane 40 is a strong and durable material especially suited for seat suspension applications. The seat suspension 30 equipped with the membrane 40 produces a well cushioned and comfortable ride while offering increased load support under impact conditions of the aforediscussed type. The stress strain curve 42 of the membrane 40 in a direction along the axis X—X is shown in FIG. 4. It shows that the membrane has high strength in the range of 75-280 MPa as compared to natural rubber elastomer membranes with a strength in the range of 10-20 MPa.

Further, the curve 42 at low strains has a relatively low slope portion 44. Hence, a small change is static load or small amplitude vibrations will produce a large change in elongation of the membrane 40 along the axis X—X between the portions thereof which are connected to the seat frame 14. In this range of elongation the membrane and the layer of foam thereon will feel comfortable because they easily conform to the shape of the passenger.

The curve at high strains has a very high slope portion 46 and hence the membrane will stiffen when large loads are imposed thereon by severe road impacts or the like. In such cases the seat suspension 30 will stiffen and provide excellent support without bottoming out on underlying frame components of a seat assembly.

Figure 3:
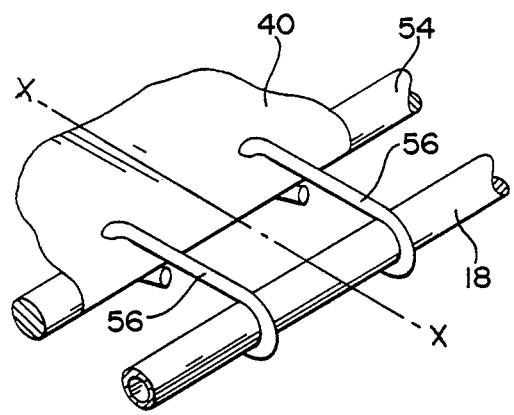
FIG. 3 is an enlarged fragmentary view of a hook detail.
Figure 2:
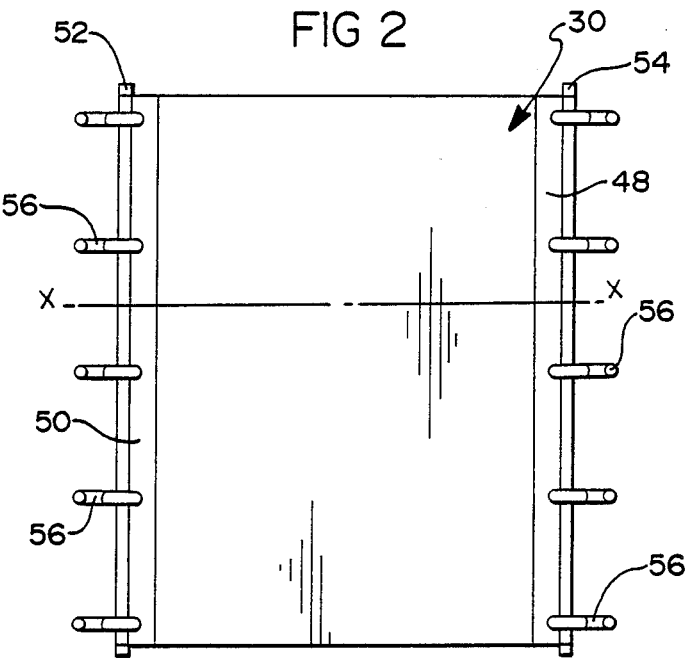
FIG. 2 is a top elevational view of a seat suspension of the present invention.

In the illustrated embodiment of FIGS. 1-3 the side edges 48, 50 of the membrane 40 are wrapped around and heat sealed to spaced parallel metal rods 52, 54, respectively. Hooks 56 are connected to each of the rods 52, 54 at spaced locations therealong. The hooks 56 are attached to the suspension tubes 18, 20 to suspend the membrane 40 therebetween to be prestretched into a range of 10%-25% elongation to provide a desired initial load support capability.

Orientation of the membrane 40 along the axis X—X increases the modulus and the tensile strength of the membrane 40 only in the direction of orientation as seen in the case of the following Table I. The amount of increase in tensile properties is proportional to the degree of orientation.

TABLE I

Tensile Properties of Oriented Hytrel Membranes and Filament

| Sample | Orientation | Comment | Thickness Mil(mm) | Modulus at 100% Elong. (MPa) | Tensile Strength (MPa) | Ultimate Elongation % |
|---|---|---|---|---|---|---|
| Original | | No orientation | 40(1.57) | 10.3 | 55.7 | 1111 |
| $S_1$ | 2.25 X | Oriented in X direction Tensile in Y direction | 11(0.43) | 11.4 | 53.0 | 1328 |
| $S_2$ | 2.25 X | Oriented in X direction Tensile in X direction | 14(0.58) | 50.5 | 107.9 | 220 |
| $D_1$ | 2.5 X 3 Y | Oriented in X & Y directions Tensile in X direction | 4.3(0.17) | 29.1 | 102.5 | 333 |
| $D_2$ | 4.4 X 3 Y | Oriented in X & Y directions Tensile in Y direction | 3.7(0.14) | 66.8 | 130.9 | 195 |
| Filament | | Oriented in X direction Tensile in X direction | — | — | 185.0 | 110 |

Figure 6:
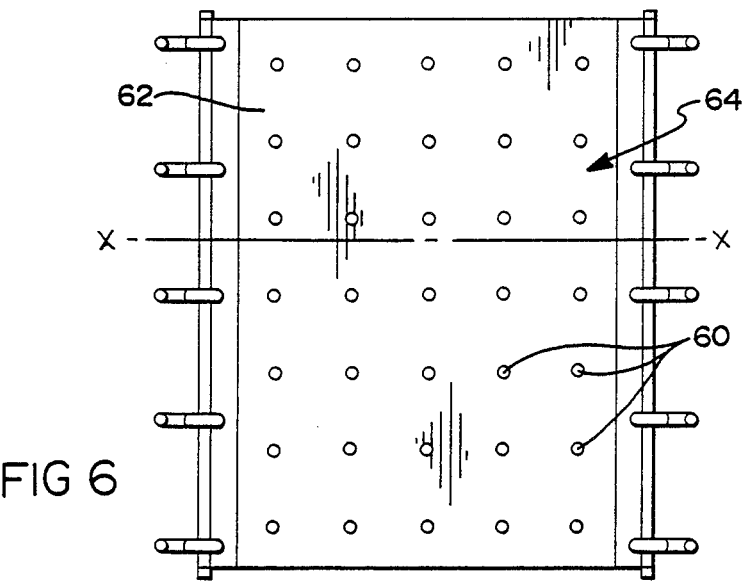
FIG. 6 is a top elevational view of another embodiment of the seat suspension of the present invention.

In the embodiment of the invention shown in FIG. 6, holes 60 are introduced into a membrane 62 to provide for breathability and to provide means for adjusting the modulus of a seat suspension 64. In the illustrated embodiment the membrane 62 is oriented in the same manner as membrane 40. The holes 60 are placed in the center region of the membrane 62 without affecting the strength of the membrane in the unoriented direction perpendicular to axis X—X. Consequently, if desired the process defined above can provide an alternative step of prepunching the membrane as it leaves the extruder and prior to being tensioned and annealed.

The results of the addition of holes in a sample segment of a membrane is set forth in following Table II.

TABLE II

Tensile Strength and elongation of Hytrel Membranes Oriented in the X-Direction. Some of the samples had 3 mm holes punched in the center of the 6.35 gauge width.

| Direction of Tensile Pull | Hole Present? | Tensile Strength (MPa) | Ultimate Elongation (%) |
|---|---|---|---|
| X | No | 75 | 180 |
| X | Yes | 67 | 100 |
| Y | No | 23 | 925 |
| Y | Yes | 38 | 858 |

From the foregoing, it should be apparent that the present invention provides a novel seat assembly of light weight and with improved static and dynamic comfort of the seat because of a full uninterrupted surface support of the passenger by means which will accommodate and conform to the shape of a passenger and which will increase in strength to support additional dynamic impact loads without bottoming out.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the invention may be practiced otherwise than as specifically described herein and yet remain within the scope of the appended claims.

The embodiments of the invention in which an exclusive property or privilege is claimed are defined as follows:

1. In a vehicle seat assembly having a seat frame with a seat thereon and a back assembly extending generally vertically with respect to the seat frame the improvement comprising:
   a seat suspension means located between the seat and the frame and suspended from the frame for absorbing vehicular vibrations and providing increased support in response to increased load;
   said seat suspension means including a membrane dimensioned to extend across substantially the full planar extent of the frame and including a direction of orientation of polymeric material which is greater across one dimension of said membrane so that the membrane has a greater modulus of elasticity in the direction of orientation and a lesser modulus of elasticity in other directions.

2. In the combination of claim 1, said direction of orientation being aligned with the direction in which increased loads impose tension on said membrane and said orientation producing a stress to strain relationship which results in increasing load support in response to increased elongation in the direction of orientation of the membrane caused by such increased loads.

3. In the combination of claim 1, said membrane being made from a block copolymer having a hard crystalline segment and a soft amorphous segment.

4. In the combination of claim 3, said copolymer consisting of polytetramethylene polyethylene terephthalate polyester and polytetramethylene ether and having a modulus of elasticity in the direction of molecular orientation which provides a low slope stress strain curve segment so as to produce large changes in elongation in response to small load changes attendant to shaping the seat to the shape of a passenger and which orientation further provides a higher slope stress strain curve segment to stiffen said membrane under increased loads to provide increased load support during extreme vehicular excursions.

5. In the combination of claim 1, said membrane having reinforcing means thereon and means for connecting said reinforcing means to the seat frame to align said reinforcing means between the seat frame and said membrane in the direction of orientation of said membrane.

6. In the combination of claim 5, said reinforcing means including reinforcing rods and heat sealed edges on said membrane formed around said rods to hold said rods with respect to said membrane;
   said connector means including hook means joined respectively to said reinforcing rods and the seat frame.

7. In the combination of claim 1, said membrane having a layer of foam material located in juxtaposed covering relationship therewith, said foam having a modulus of elasticity in the range of less than 1 MPa which combines with the nonzero modulus of elasticity of said membrane to conform to the shape of a passenger and to shape said membrane to cause it to further support such shape.

8. In the combination of claim 7, said direction of orientation being aligned with the direction in which increased loads impose tension on said membrane and said orientation producing a stress to strain relationship which results in increasing load support in response to increased elongation in the direction of orientation of the membrane caused by such increased loads.

9. In the combination of claim 7, said membrane being made from a block copolymer having a hard crystalline segment and a soft amorphous segment.

10. In the combination of claim 7, said block copolymer consisting of polytetramethylene terephthalate polyester and polytetramethylene ether and having a modulus of elasticity in the direction of molecular orientation which provides a low slope stress strain curve segment so as to produce large changes in elongation in response to small load changes attendant to shaping the seat to the shape of a passenger and which orientation further provides a higher slope stress strain curve segment to stiffen said membrane under increased loads to provide increased load support during extreme vehicular excursions.

11. In the combination of claim 7, said membrane having reinforcing means thereon and means for connecting said reinforcing means to the seat frame to align said reinforcing means between the seat frame and said membrane in the direction of orientation of said membrane.

12. In the combination of claim 11, said reinforcing means including reinforcing rods and heat sealed edges on said membrane formed around said rods to hold said rods with respect to said membrane;
   said connector means including hook means joined respectively to said reinforcing rods and the seat frame.

13. In a vehicle seat suspension including an interface between a frame of a vehicle seat assembly and a layer of foam material for defining a support for accommodating the shape of a passenger at a first modulus of elasticity and for supporting road impact imposed loads at a second modulus of elasticity greater than the first modulus of elasticity the improvement comprising:
   an extruded sheet of elastomeric material having a first modulus of elasticity in a first range of elongation of the elastomeric material and a second modulus of elasticity greater than the first modulus in a second range of elongation which is greater than the first range of elongation;
   means for connecting the extruded sheet with respect to the frame to place it in tension to prestretch it to the lower limit of the first range of elongation;
   said first range of elongation accommodating displacements of the layer of foam material imposed thereon by static loads placed on the foam material imposed thereon by static loads placed on the form layer while conforming the shape of said extruded sheet to such displacements and said second range of elongation stiffening the extruded sheet to support road impact loading while restricting further elongation of said extruded sheet to the confines of the seat frame to which said extruded sheet is attached.

* * * * *